(12) United States Patent
Ikeda

(10) Patent No.: US 6,490,946 B2
(45) Date of Patent: Dec. 10, 2002

(54) APPARATUS FOR CONNECTING AN OPERATING CABLE AND METHOD FOR CONNECTING THE SAME

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/833,064

(22) Filed: Apr. 12, 2001

(65) Prior Publication Data

US 2002/0002870 A1 Jan. 10, 2002

(30) Foreign Application Priority Data

Apr. 12, 2000 (JP) .................................. 2000-110708

(51) Int. Cl.$^7$ ................................................ F16C 1/10
(52) U.S. Cl. ..................... 74/500.5; 74/502.4; 74/502.6; 403/353
(58) Field of Search ............................. 74/500.5, 502.6, 74/502.4; 403/315, 316, 317, 319, 345, 353, 395, 230

(56) References Cited

U.S. PATENT DOCUMENTS

| 5,311,793 A | * | 5/1994 | Panek et al. ................ 74/502.6 |
| 5,720,367 A | * | 2/1998 | Evans ..................... 188/79.64 |
| 6,318,207 B1 | * | 11/2001 | Asai et al. ................. 74/502.6 |

FOREIGN PATENT DOCUMENTS

DE          4307861 A1  *  9/1994   ........... B60T/13/08

* cited by examiner

Primary Examiner—Thomas R. Hannon
Assistant Examiner—Justin Stefanon
(74) Attorney, Agent, or Firm—Liniak, Berenato & White

(57) ABSTRACT

An apparatus for connecting an operating cable to an actuating lever and a method for connecting the same. A cable end nipple is automatically rotated and proceeded into a space reserved between parallel walls of a strut simply by pushing the cable end nipple toward a space between parallel walls in a cable releasing direction. The present apparatus and method eliminates the necessity of horizontally adjusting the connecting portion of the cable end nipple and the free end of the brake cable as is found in conventional devices.

4 Claims, 10 Drawing Sheets

APPARATUS FOR CONNECTING AN OPERATING CABLE AND METHOD FOR CONNECTING THE SAME

BACKGROUND OF THE INVENTION

1. Field of the Invention

This invention relates to an actuating mechanism mechanically actuating responsive members such as brake shoes of a drum brake by rotating an actuating lever, and particularly to an apparatus and method for connecting an operating cable to an actuating lever.

2. Description of the Related Art

A typical apparatus is, for example, employed in a brake cable connecting apparatus designed to connect the brake cable to the brake lever as a component of a mechanical actuating mechanism for a drum brake device.

Normally, the mechanical actuating mechanism has a mechanism in which one brake shoe, as one responsive member, engages with one end of a strut and the other brake shoe, as another responsive member, engages with the brake lever in the vicinity of a pivot section between the brake lever and the other end of the strut. A cable end nipple on the brake cable is connected on the free end of the brake lever in the cable operating direction; and the brake lever and the strut rotate relative to each other around the pivot section of the same upon operating the brake cable, so that both brake shoes are urged to separate apart from each other.

An available structure of the brake cable connecting apparatus, connecting the cable end nipple on the free end of the brake lever in the cable operating direction, is described bellow. The free end of the brake lever is branched away two opposed splitting parallel plates separating in a direction of a rotation axis of the brake lever. The free end of the brake lever is rotatable between two opposed splitting parallel walls at an intermediate portion between both ends of the strut. A cable end nipple with a various flat portion, such as a partially disk-like shape, is positioned between the parallel plates constituting the free end of the brake lever, and columnar projections, projecting out from the respective flat side surfaces of a flat portion of the cable end nipple, is connected on the free end of the brake lever in the cable operating direction.

This structure has an advantage of minimizing the size of the mechanical actuating mechanism.

A method of hooking the columnar projections of the cable end nipple on the free end of the brake lever is described bellow.

The cable end nipple is rotated around the cable axis so that the flat side surfaces of the flat portion of the cable end nipple become parallel to the parallel plates of the brake lever. Such a conditioned cable end nipple is entered into the space between the parallel walls of the strut in a cable releasing direction so that the columnar projections push the brake lever to rotate in the same direction. The columnar projections are passed through a tip of the free end of the brake lever, thereby ending the rotation of the brake lever. Therefore the brake lever rotates back to return to an initial position. The brake cable is pulled in the cable operating direction to position the flat portion in between the free ends of the parallel plates so as to hook the columnar projections thereon making an engagement therebetween.

There exists a demand for minimizing the actuating mechanism in the brake lever rotation axis by shortening the columnar projections projecting from the flat portion of the cable end nipple. Hence, the thickness of the flat portion is designed as thin as possible, and the width of the parallel plates of the brake lever is designed to be a bit wider than the thickness of the flat portion. Furthermore, the width between the parallel walls of the strut is specified a minimum width necessary for passing the rotated cable end nipple through, i.e., the width being a bit wider than a dimension between the projected tips of both columnar projections.

Accordingly, when connecting the cable end nipple or hooking the columnar projections of the cable end nipple to the free end of the brake lever, if the two flat side surfaces of the flat portion of the cable end nipple are not pre-rotated around the cable axis readily and precisely parallel to the parallel plates of the brake lever, the parallel walls of the strut become obstacles preventing the cable end nipple from further proceeding into the space between the parallel walls. However, if the brake drum is fully covered, visual observation of the free end of the brake lever during the connecting operation often is a very difficult task. In such instance there is a concern of poor accessibility for connecting the brake cable.

SUMMARY OF THE INVENTION

An object of this invention is to make arrangements in the above-conventional brake cable connecting apparatus in order to improve a connecting operability of the brake cable. This invention attains the object of the improved operability by adding a feature of the cable end nipple to automatically be rotated and proceeded into a space reserved between the parallel walls of the strut simply by pushing the cable end nipple toward the space between the parallel walls in the cable releasing direction.

Another object of this invention is to improve the brake cable connecting operation after being positioned in the space between the parallel walls of the strut by eliminating the conventionally necessary horizontal adjustment of the cable end nipple to be specifically aligned with the connecting portion of the cable end nipple and the free end of the brake cable.

BRIEF DESCRIPTION OF THE DRAWINGS

The above and other objects and advantages of the present invention will become readily apparent by reference to the following detailed description when considered in conjunction with the accompanying drawings.

DETAILED DESCRIPTION OF PREFERRED EMBODIMENT

The first embodiment of this invention is explained with reference to the accompanied figures.

Figure 1:
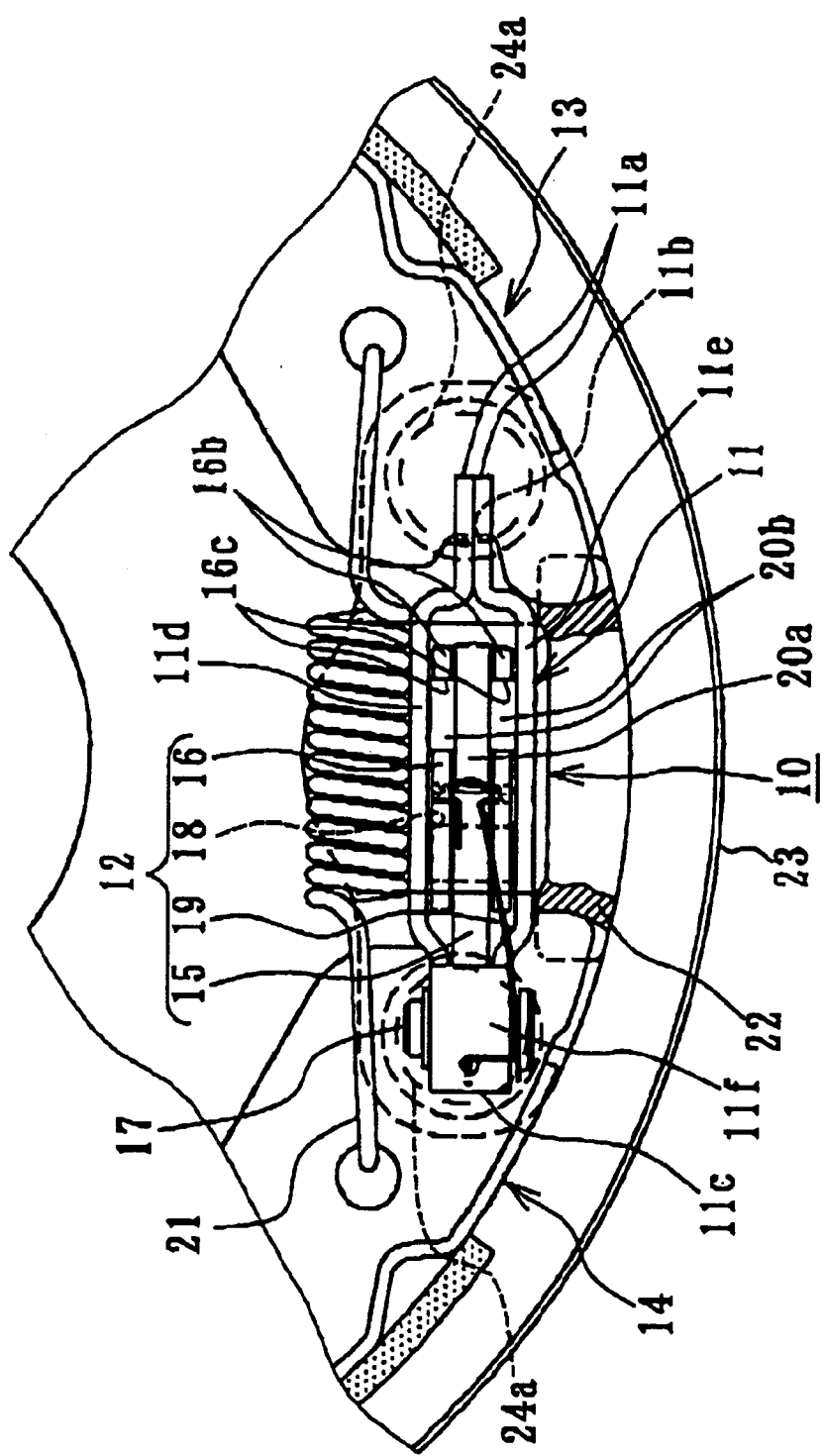
FIG. 1 is a plan view of the drum brake actuating mechanism with a brake cable connecting apparatus of the first embodiment in this invention.
Figure 2:
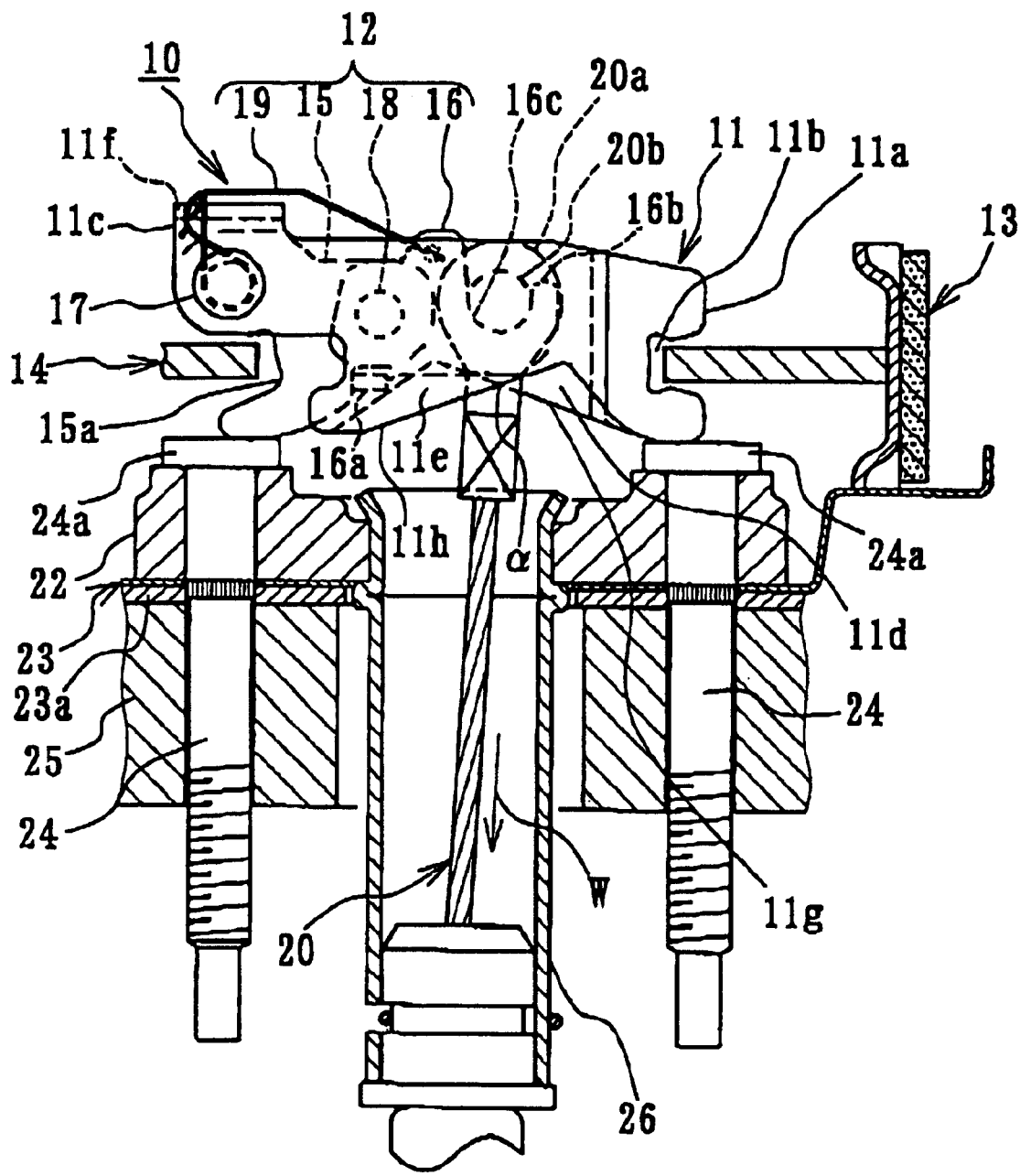
FIG. 2 is a vertical cross-section view of the same drum brake actuating mechanism.

FIGS. 1 and 2 illustrate one embodiment of a drum brake actuating mechanism 10 with a brake cable connecting apparatus. FIGS. 3–8 illustrate a connecting process for connecting the brake cable relative to the drum brake actuating mechanism 10 mainly comprising a strut 11 and a brake lever 12 as shown in FIGS. 1 and 2.

The strut 11 is disposed and extended between adjacent ends of the two responsive members, i.e., brake shoes 13, 14. One end 11a of the strut 11 has a first notched groove 11b to be engaged with an operating end of the brake shoe 13.

The brake lever 12 is divided into two members, i.e., a pivot-side lever 15 and an operation-side lever 16. The pivot-side lever 15 is pivotally supported by a first pivot pin 17 on the other end 11c of the strut 11 further away from one end 11a with the first notched groove 11b and has a second notched groove 15a to be engaged with an operating end of the other brake shoe 14.

The operation-side lever 16 is pivotally supported by a second pivot pin 18 on the free end of the pivot-side lever 15.

A tip of the spring 19 wounded around the first pivot pin 17 preventing the spring rotation, is engaged with the operation-side lever 16, thereby applying a clockwise rotation force to the operation-side lever 16 around the pin 18 as shown in FIG. 2. The clockwise rotation of the operation-side lever 16 is restricted by a stopper 16a provided on the operation-side lever 16.

The operation-side lever 16 is a composition of a pair of integrally formed two opposed splitting parallel plates 16b, 16b between which a plan pivot-side lever 15 is sandwiched. A free end of the operation-side lever 16, i.e., the free end of the brake lever 12, is composed of parallel plates 16b, 16b constituting a branch together with the pivot-side lever 15. A space is provided between the parallel plates 16b, 16b where the disk-like flat portion 20a of the cable end nipple of the brake cable 20 can enter and pass through.

Columnar projections 20b, 20b project from both flat side surfaces of the flat portion 20a of the cable end nipple and are integrated therewith. Nipple pockets 16c, 16c are shaped for an engagement with the columnar projections 20b, 20b on the parallel plates 16b, 16b.

Referring back to the strut 11, the strut 11 is comprised of one plate bent in a rectangular-frame. Two opposed splitting parallel walls 11d, 11e of the strut 11 are oppositely positioned one another and are connected at one end 11a to be engaged with the first notched groove 11b by a conventional means such as a spot welding, while the other end 11c is separated to sandwich the pivoting portion of the pivot-side lever 15 therebetween. A bridge 11f is integrally extended between the top of parallel walls 11d, 11e. The space between the two walls 11d and 11e at an intermediate portion between both ends 11a and 11c are designed to be wider than a space between the two at the other end 11c to keep a sufficient space for the rotation of the operation-side lever 16.

Figure 3:
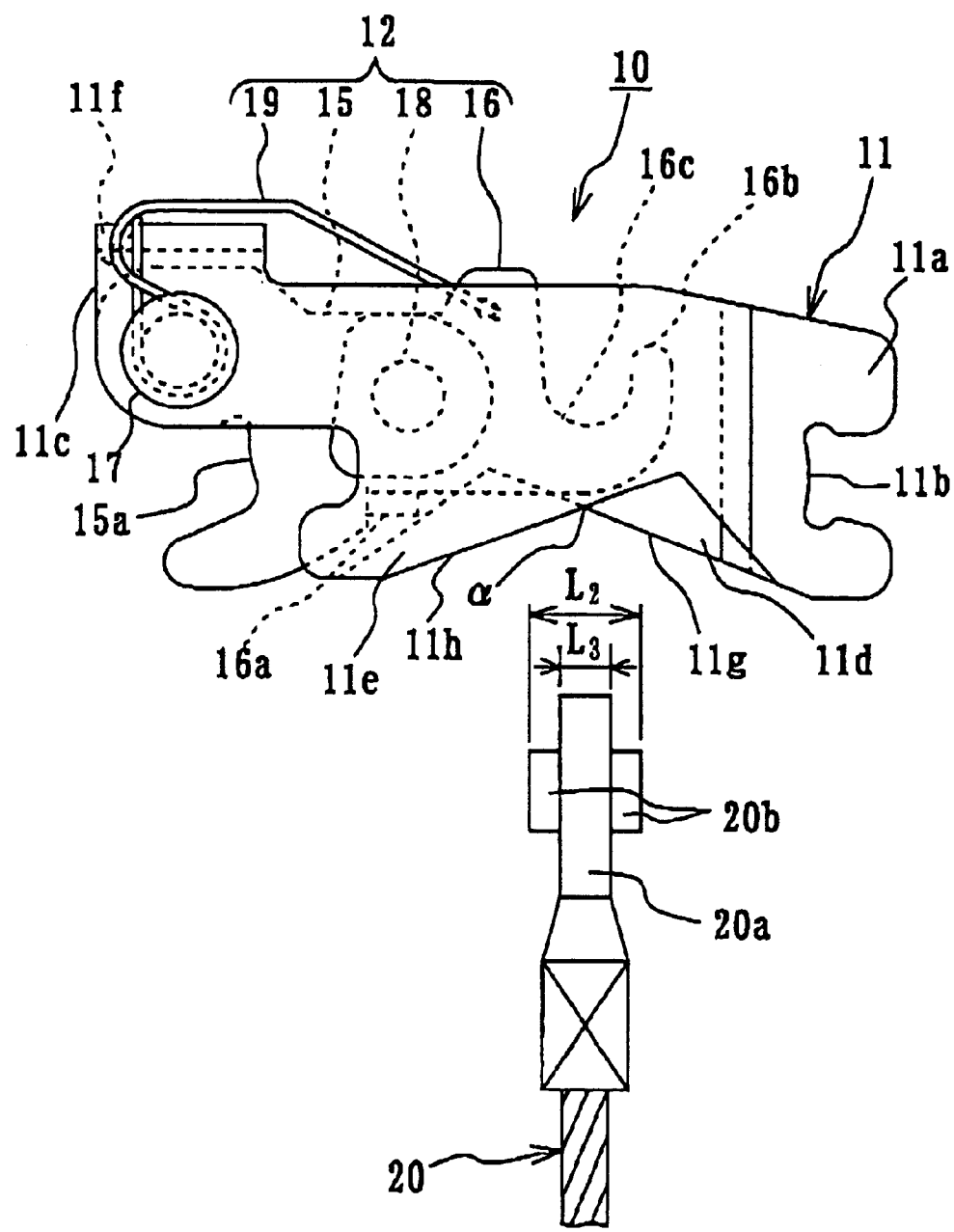
FIG. 3 is an explanation view of the process for connecting the brake cable prior to the entrance of the cable end nipple into the space between the two opposed splitting parallel walls of the strut with regard to the same drum brake actuating mechanism.
Figure 6:
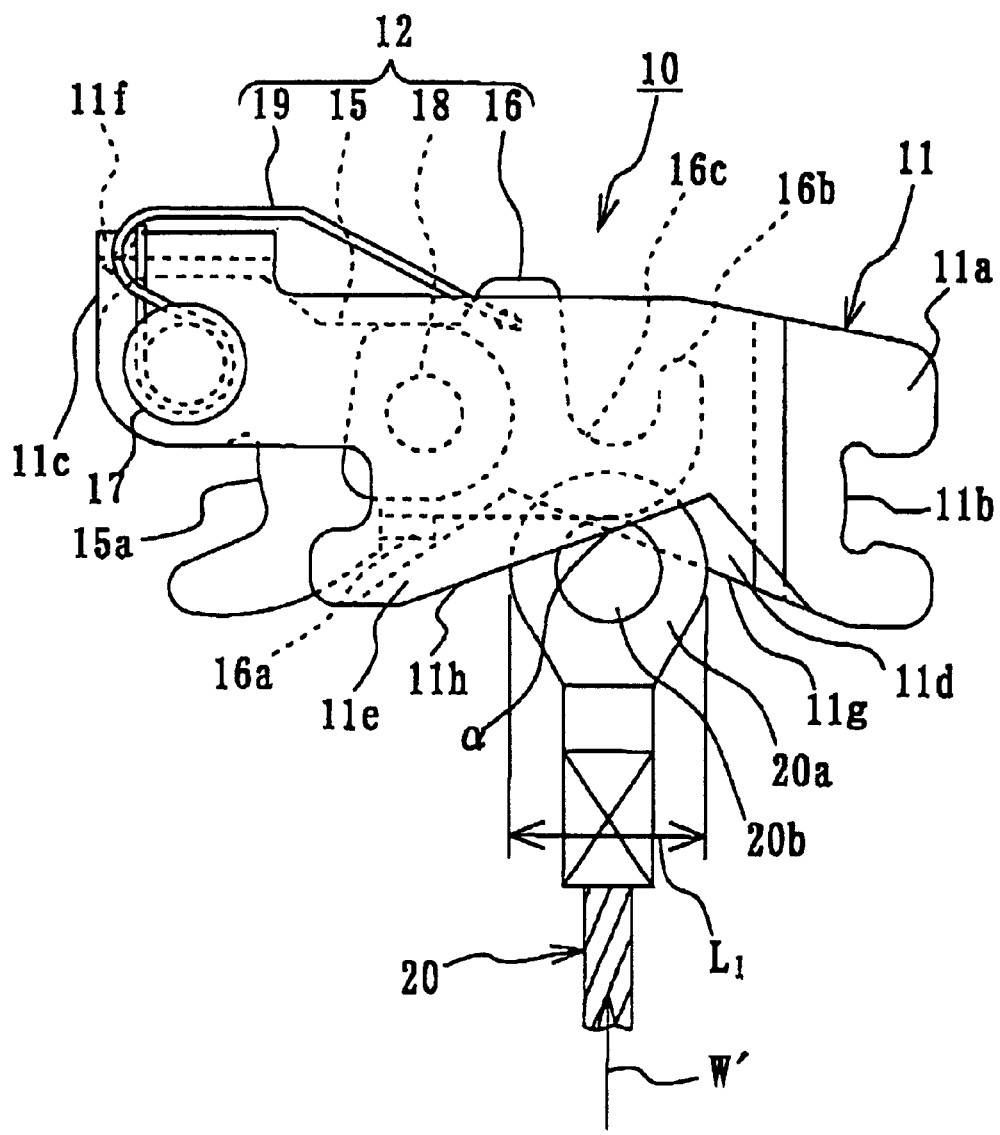
FIG. 6 is an explanation view of the process for connecting the brake cable when the cable end nipple begins to proceed into the space between the parallel walls of the strut.

The cable end nipple is comprised of the disk-like flat portion 20a and the columnar projections 20b, 20b projecting from both side surfaces of the flat portion 20a. In response to a demand that the cable end nipple in the situation in FIG. 3 cannot pass through the strut 11, but the cable end nipple in the situation in FIG. 6 can pass through the strut 11, a distance L2 between both edges of the columnar projections 20b, 20b as shown in FIG. 3 is designed to be shorter than a diameter L1 of the disk-like flat portion 20a as shown in FIG. 6.

The space formed between the parallel walls 11d, 11e is to be a minimum width necessary for the distance L2 between both edges of the columnar projections 20b, 20b to pass through. Accordingly, the space is not wide enough for the diameter Li of the disk-like flat portion 20a to pass through.

The space formed between the parallel plates 16b, 16b at the free end of the operation-side lever 16 is to be a minimum width necessary for a thickness L3 of the disk-like flat portion 20a to pass through. Accordingly, the space is not wide enough for the distance L2 between both edges of the columnar projections 20b, 20b to pass through.

A shoe return spring 21 is extended between adjacent operating ends of both brake shoes 13, 14 as shown in FIG. 1 in order to abut the adjacent operating ends of the brake shoes 13, 14 against a common anchor block 22. As illustrated in FIG. 2, the anchor block 22 and a back plate 23 with a stiffener 23a are integrally fastened with knuckle 25 fixed on a vehicle body by a pair of bolts 24, 24, and the brake actuating mechanism 10 is mounted on heads 24a, 24a of the bolts 24, 24.

If a cable operating force as appeared in arrow W of FIG. 2 is applied to the operation-side lever 16, i.e., the brake lever 12, via the brake cable 20, the brake lever 12 comprising the pivot-side lever 15 and the operation-side lever 16 rotates clockwise around the pivot pin 17 in FIG. 2, thereby pushing the brake shoe 14 to the left in FIG. 2.

The rotation of the brake lever 12 around the pivot pin 17 gives a counter force to the strut 11 via the pivot pin 27, which pushes the strut 11 together with the brake shoe 13 to the right in FIG. 2.

Accordingly, both brake shoes 13, 14 move to separate each other to press an inner circumferential surface of the brake drum, thereby effecting brake application.

To hook the columnar projections 20b, 20b of the cable end nipple in the nipple pockets 16c, 16c on the operation-side lever 16, i.e., the brake lever 12, of the brake actuating mechanism 10, initially, the cable end nipple is inserted from the outside into the drum brake passing all the way through the cable guide 26 being fixed in the anchor block 22 vertically penetrating the knuckle 25, and the back plate 23 as appeared in FIG. 2.

The cable end nipple is rotated around the cable axis to the degree so that the both flat side surfaces of the flat portion 20a of the cable end nipple become parallel to the parallel walls 11d, 11e and the cable end nipple is proceeded into the space between the parallel walls 11d, 11e in the cable releasing direction W'.

Figure 7:
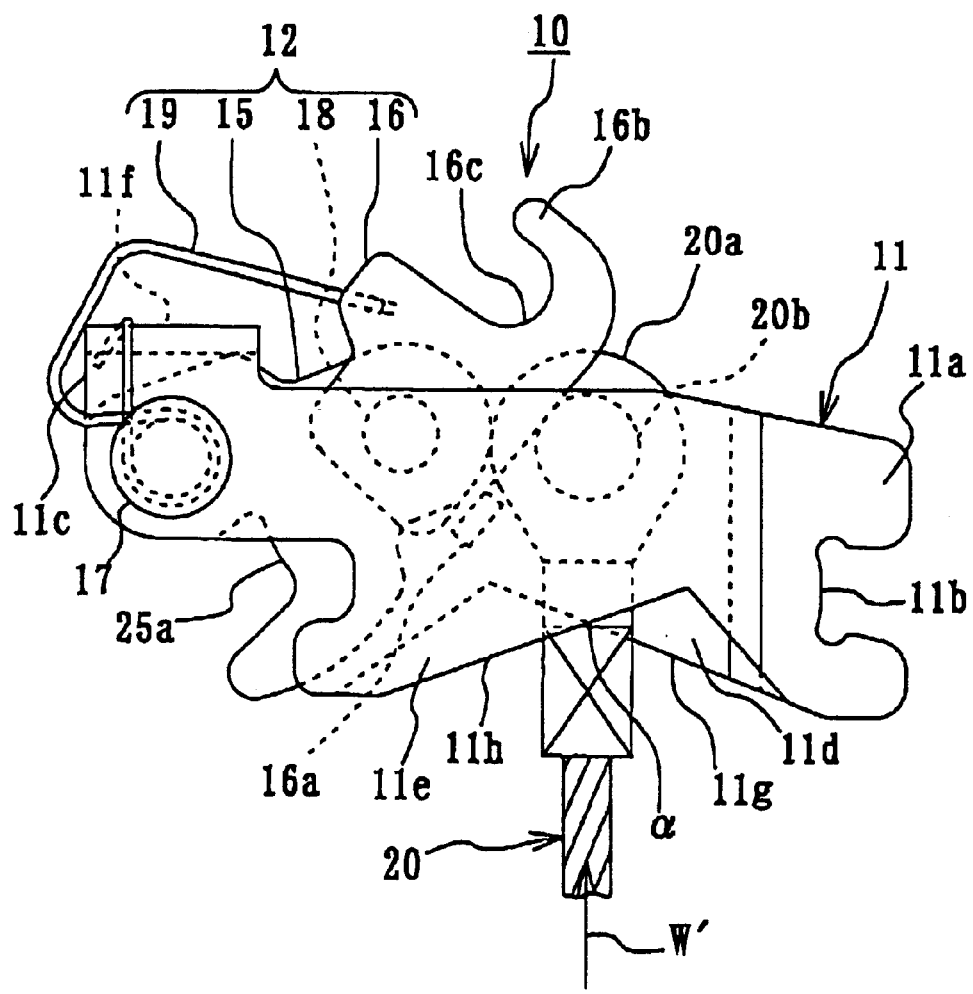
FIG. 7 is an explanation view of the process for connecting the brake cable when the cable end nipple is passing inside the strut.

As shown in FIG. 7, the step of proceeding the cable end nipple into the space is accomplished by designing the columnar projections 20b, 20b to push and rotate the operation-side lever 16 counterclockwise around the pivot pin 18 against a resilient force of the spring 19.

Figure 8:
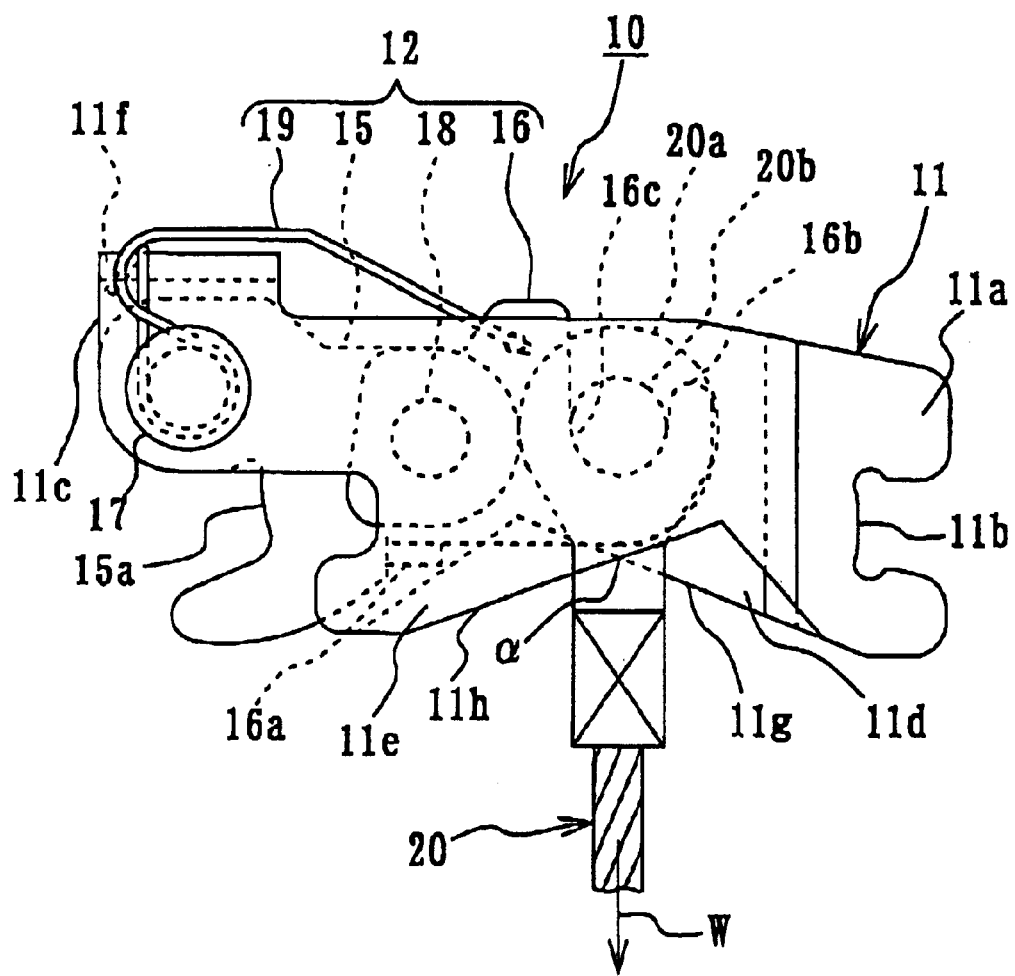
FIG. 8 is an explanation view of the process for connecting the brake cable when the cable end nipple is positioned and engages with the free end of the brake lever after passing inside the strut.

As shown in FIG. 8, after the step of the columnar projections 20b, 20b passing the operation-side lever 16, a resilient force of the spring 19 rotates the operation-side lever 16 clockwise around the pin 18, and the operation-side lever 16 returns back to an initial position where the stopper 16a of the operation-side lever 16 contacts the pivot-side lever 15.

Under this circumstance, the cable end nipple is pulled in the cable operating direction W in FIG. 8, resulting in the engagement between the columnar portion 20b, 20b projecting from both side surfaces of the flat portion 20a and the nipple pockets 16c, 16c.

Figure 4:
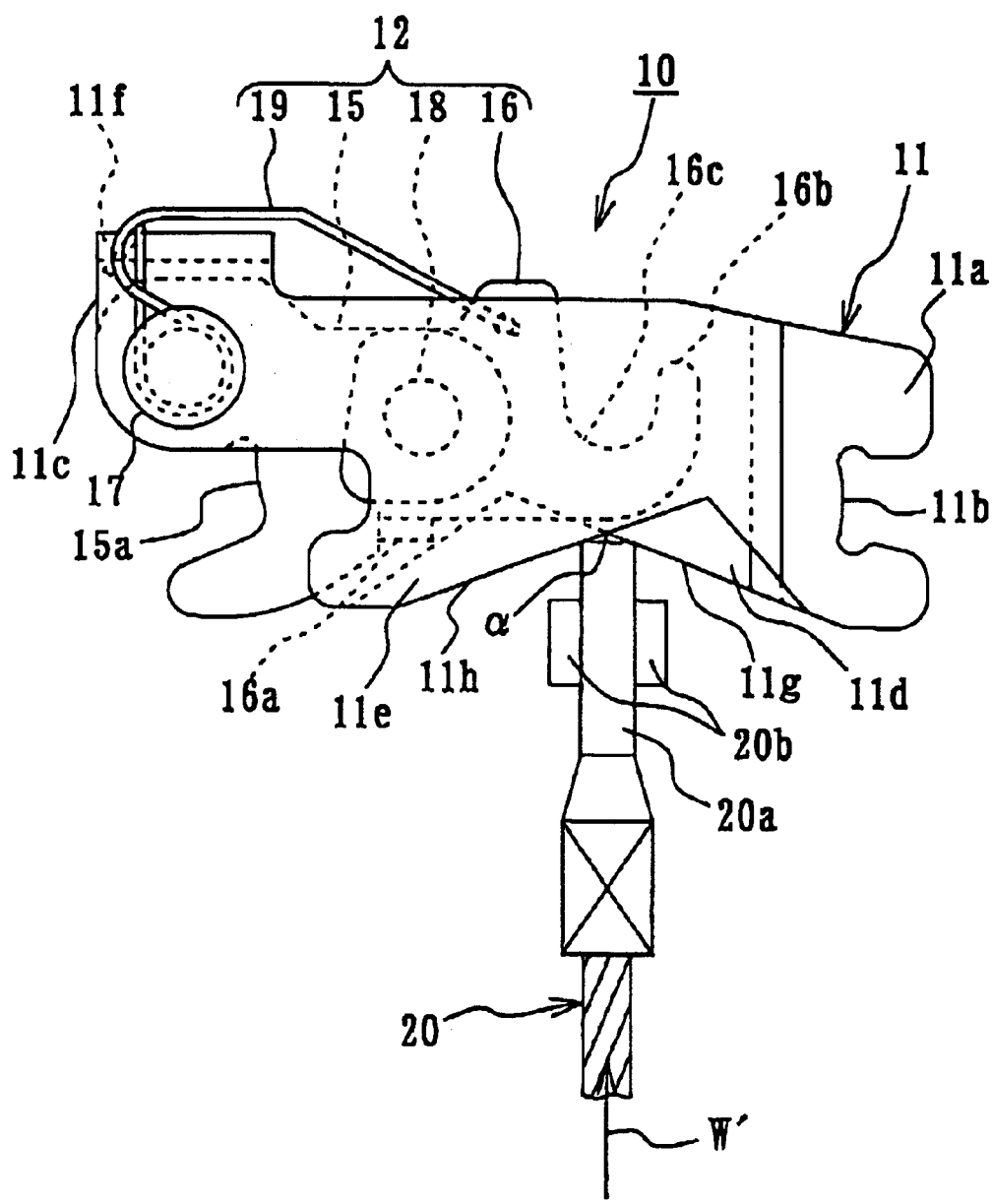
FIG. 4 is an explanation view of the process for connecting the brake cable when the cable end nipple contacts and is pressed against the strut.
Figure 5:
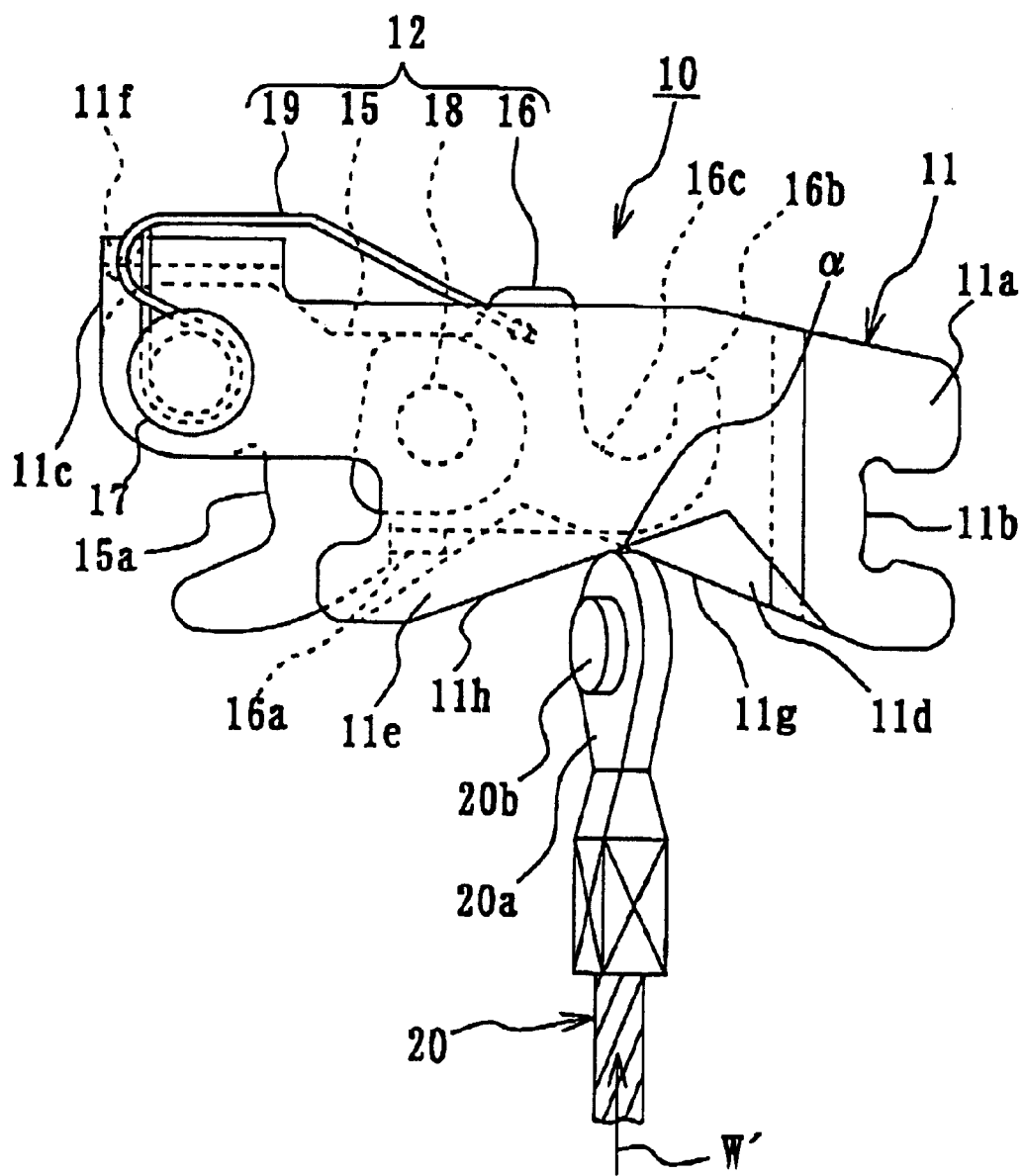
FIG. 5 is an explanation view of the process for connecting the brake cable when the cable end nipple is pushed toward the space between the parallel walls of the strut and begins to rotate to be aligned with the strut.

With respect to this embodiment, when connecting the brake cable as illustrated in FIG. 3, even if the cable end nipple stays at the location so that the both flat side surface of the flat portion 20a are still across from the parallel walls 11d, 11e, as appeared in the structure of FIG. 2, the cable end nipple only needs to be pushed up in the cable releasing direction W' as shown in FIG. 4 to be automatically rotated around the cable axis to be aligned to enter into the space between the parallel walls 11d, 11e, thereby facilitating the brake cable connecting operation.

The outer edge lines 11g, 11h of the parallel walls 11d, 11e at their cable operating direction W side, located around intermediate portions between the both ends of the strut 11, are oppositely inclined to intercross each other at a point a viewed from the direction of the rotation axis of the brake lever 12, i.e., axis of the pin 17.

Regardless of the location that the cable end nipple interferes with the outer edge lines 11g, 11h on the parallel walls 11d, 11e as shown in FIG. 3, when the cable end nipple is pushed in the cable releasing direction W' as shown in FIG. 4, the cable end nipple is automatically aligned so as to permit the cable end nipple entering the space between the parallel walls 11d, 11e while applying a rotational force around the brake cable axis against the oppositely inclined intercrossing outer edge lines 11g, 11h of the parallel walls 11d, 11e of the strut 11.

Accordingly, for the connect of the brake cable 20, it is not necessary for the cable end nipple to be pre-rotated around the cable axis into a position that both flat side surfaces of the flat portion 20a is parallel to the parallel walls 11d, 11e as shown in FIG. 6, thereby improving the connecting operability of the brake cable 20.

As shown in FIGS. 2–8, preferably, the intercrossing point o between the oppositely inclined intercrossing outer edge lines 11g, 11h at the bottom of the parallel walls 11d, 11e is vertically aligned with the connecting portion between the cable end nipple, i.e., the columnar projection 20b, 20b, and the nipple pocket 16c of the operation-side lever 16 along the cable operating direction.

Such a pre-alignment of the intercrossing point eliminates the need of an extra step of a horizontal movement of the columnar projection 20b, 20b to be aligned with the nipple pockets 16c, 16c after the cable end nipple passes through an end line of the free end on the operation-side lever 16. This will also improve the connecting operability of the brake cable 20.

Figure 9:
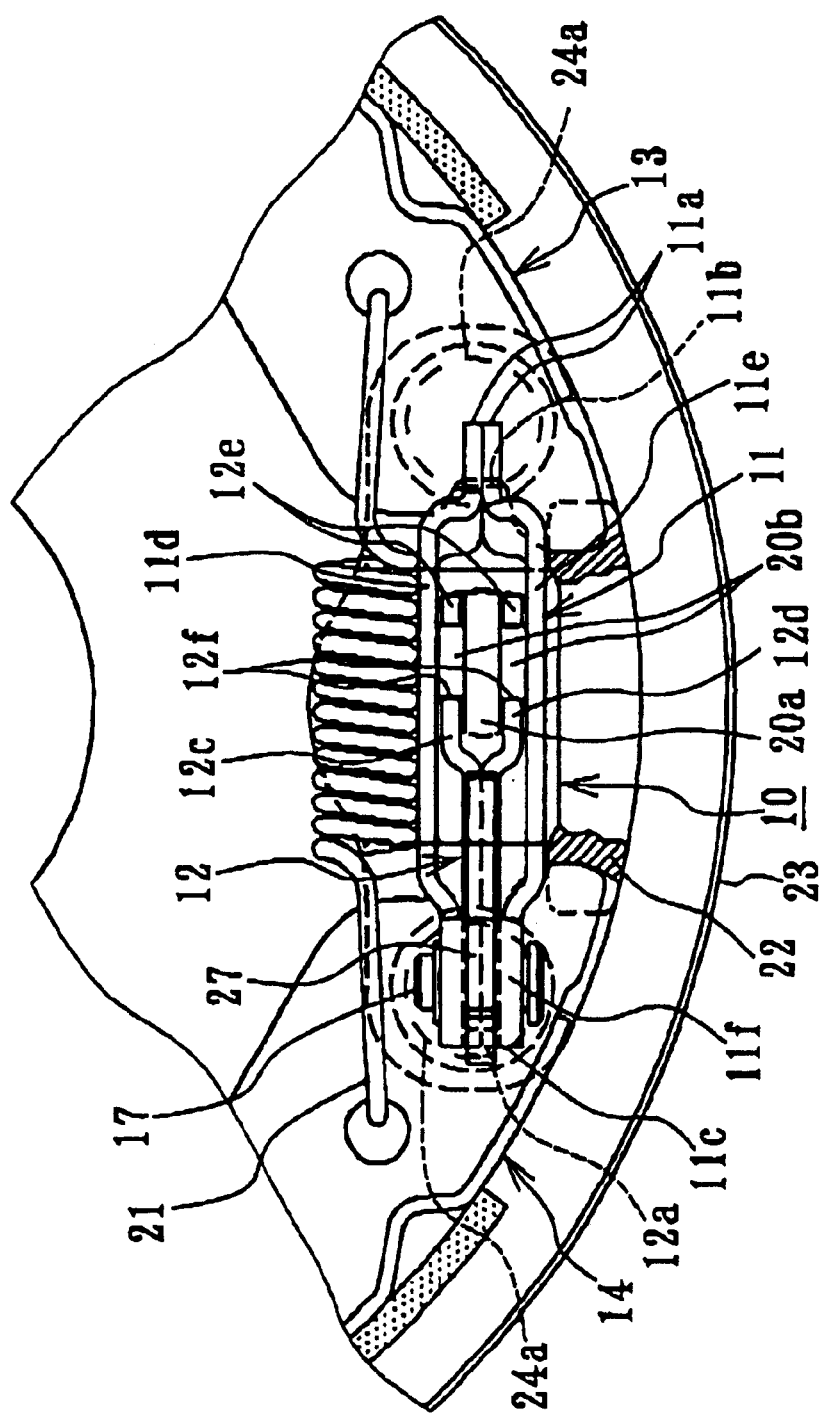
FIG. 9 is a plan view for another embodiment of the drum brake actuating mechanism with the brake cable connecting apparatus.
Figure 10:
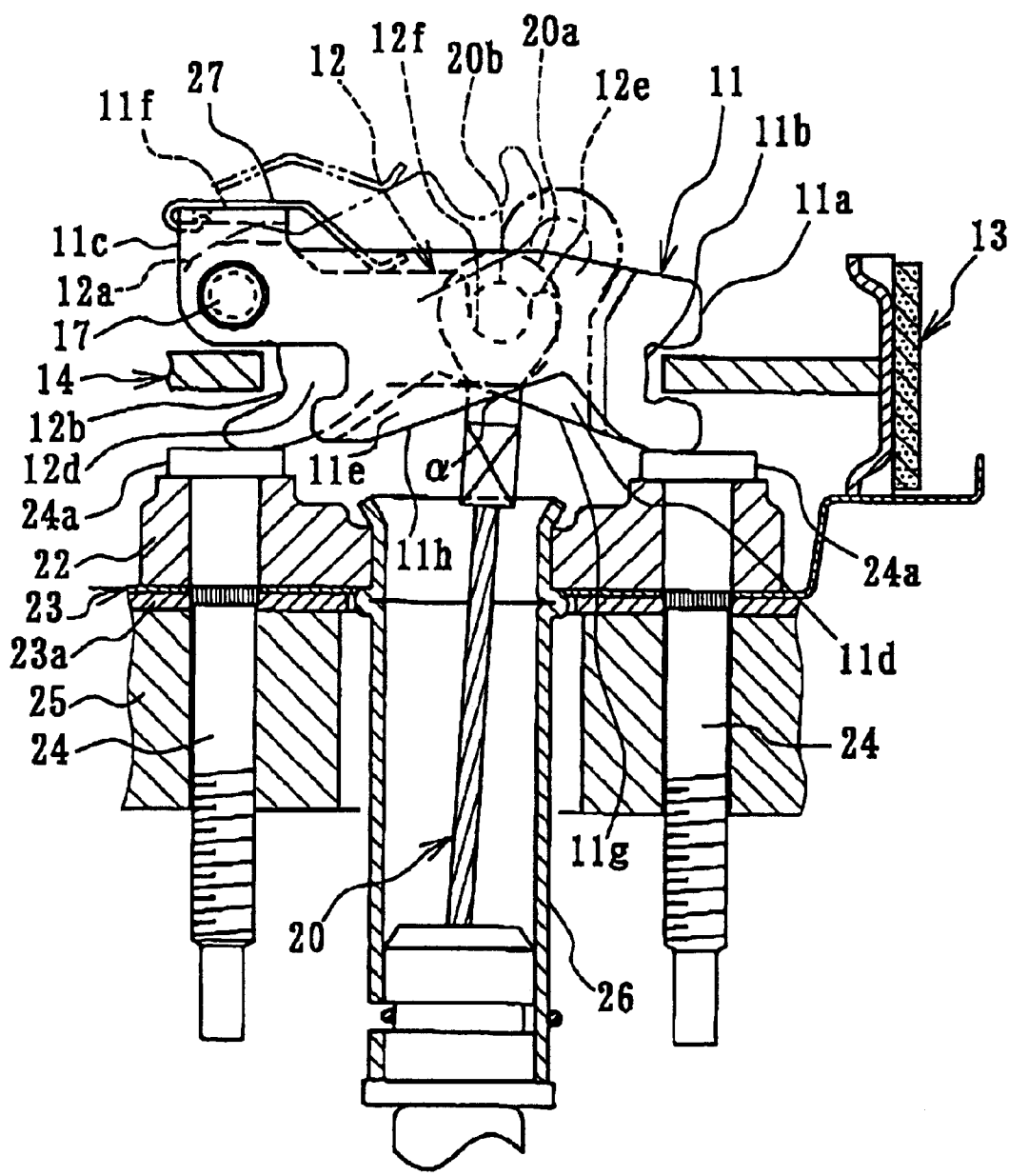
FIG. 10 is a vertical cross-section view of the drum brake actuating mechanism of FIG. 9.

The first embodiment employs a hemisecitoned brake lever structure including the pivot-side lever 15 and the operation-side lever 16. However, as shown in FIGS. 9 and 10, the brake lever 12 may be an integral structure with the same objects and advantages of the invention as in the hemisecitoned structure.

The brake lever 12 of the integral structure has base end 12a pivotally supported on the other end 11c of the strut 11 by the pivot pin 17 and a second notched groove 12b in the vicinity of the pivot section between the brake lever and the strut 11 for engaging with the operating end of the brake shoe 14.

The brake lever 12 is composed of a pair of oppositely positioned splitting parallel plates 12c, , 12d. Adjacent end portions of the opposed splitting plates 12c, 12d, to be pivoted on the other end 11c of the strut 11 by the pivot pin 17, are attached and integrated each other by conventional means such as a spot welding. As shown in FIG. 9, free end 12e of the brake lever 12 is branched away as parallel plates 12c, 12d to allow the flat portion 20a to be proceeded into the space reserved therebetween. Both branched free ends 12e, 12e of the parallel plates 12c, 12d have nipple pockets 12f for the engagement with the columnar projection 20b, 20b.

The brake lever 12 is resiliently supported by a top end portion of the plate spring 27 attached to the bridge 11f on top of the strut 11 at one end thereof.

The outer edge lines 11g, 11h of the parallel walls 11d, 11e at the intermediate portions of both ends of the strut 11 are oppositely inclined to intercross each other as suggested by the point a viewed from the direction of the rotation axis of the brake lever 12, i.e., the axis of the pivot pin 17. Therefore, regardless of the different lever structure characterized in the integrally formed brake lever 12 without being separated into pieces, this embodiment provides the same improvements in connecting operability of the brake cable as provided in FIGS. 1–8.

In a second embodiment, during the process of proceeding the cable end nipple in the cable releasing direction into the space between the parallel walls 11d, 11e indicated in a two-dot chain line, the columnar projection 20b, 20b push the brake lever to rotate the same altogether counterclockwise in FIG. 10 around the pivot pin 17 against the spring force of the plate spring 27.

After the columnar projection 20b, 20b pass through the brake lever 12, as indicated in a full line of FIG. 10, the brake lever 12 rotates altogether clockwise around the pivot pin 17 by the resilient force of the plate spring 27 rotating back to return the same to an initial position. In this circumstance, the cable end nipple is pulled in the cable operating direction, resulting in the engagement between the columnar projection 20b, 20b projecting from both side surfaces of the flat portion 20a of the cable end nipple and the nipple pocket 12f, 12f.

In the actuating mechanism of this invention, pulling the brake cable, connected on the free end of the brake lever, rotates the brake lever and the strut relative to each other around a pivot section, thereby moving both responsive members respectively engaging with the brake lever and the strut to separate.

The free end of the brake lever is branched away as parallel plates, separating in the direction of the rotation axis of the brake lever, and is rotatable between the parallel walls at the intermediate portion between both ends of the strut. In the process of hooking the columnar projections projecting out from both flat side surfaces of the flat portion of the cable end nipple on the free end of the brake lever in the cable operating direction, the cable end nipple is rotated around the cable axis so that the flat side surfaces of the flat portion become parallel to the parallel plates. In this condition, the cable end nipple is entered into the space between the parallel walls in the cable releasing direction so that the columnar projections push the brake lever to rotate in the same direction. The columnar projection is passed through a tip line on the free end of the brake lever; thereby ending the rotation of the brake lever by the columnar projections. The brake cable is then pulled in the cable operating direction to make an engagement between the columnar projections and the free end of the brake lever as well as to position the flat portion in between the parallel plates.

One feature of this invention is characterized in that outer edge lines on the parallel walls of the strut, at their cable operating direction side located around an intermediate portion between both ends of the strut, are oppositely inclined to intercross each other viewed from the direction of the rotation axis of the brake lever. Therefore, regardless of the location that the cable end nipple interferes with the outer edge lines on the parallel walls, when the cable end nipple is pushed in the cable releasing direction, the cable end nipple is aligned so as to permit the cable end nipple entering a space between the parallel walls while applying a rotation force around the brake cable axis against the oppositely inclined intercrossing outer edge lines of the parallel walls.

Accordingly, the cable end nipple is automatically rotated to make the flat side surfaces of the cable end nipple parallel to the two opposed side surfaces of the brake lever simply by pushing the cable end nipple against the intercrossed outer edge lines on the parallel walls. This facilitates the operation of connecting the cable end nipple or the columnar projections thereof on the free end of the brake lever, ultimately improving the mounting operability of the parking brake cable.

Another feature of this invention is characterized in that the intercrossing section between the oppositely inclined intercrossing outer edge lines, on the parallel walls of the strut viewed from the direction of the rotation axis of the brake lever, is aligned with the hooking section of the columnar projections of the cable end nipple on the free end of the brake lever along the cable operating direction. Hence, after the cable end nipple proceeding into the space between the parallel walls, a conventionally necessary step of horizontal adjustment of the cable end nipple to be aligned with a corresponding position with the hooking portion between the columnar projections and the free end of the brake lever is no longer required, thereby improving the connecting operability of the brake cable.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention. Accordingly, reference should be made to the following claims in determining the full scope of the invention.

What we claim is:

1. An operating cable apparatus comprising;
    a strut, one end thereof engaging with one responsive member,
    an actuating lever pivotally mounted on another end of said strut and engaging with another responsive member in the vicinity of a pivot section between said actuating lever and the other end of said strut, in which a free end of said actuating lever, rotatably disposed in a space between two opposed splitting walls at an intermediate portion between both ends of said strut, branches away two opposed splitting plates being separated in a direction of a rotation axis of said actuating lever,
    a cable end nipple, comprised of a flat portion and projections projecting from two flat side surfaces of said flat portion, said projections being securely fixed on one end of the operating cable, in which said flat portion is positioned between said two opposed splitting plates of said actuating lever, and
    said projections being hooked on said free end of the actuating lever in a cable operating direction,
    said cable end nipple being connected to said free end of the actuating lever and establishing a connection between said cable end nipple and said free end of the actuating lever,
    wherein outer edge lines on said two opposed splitting walls of said strut at their cable operating direction side located around an intermediate portion between the two strut ends are oppositely inclined to intercross each other viewed from the direction of the rotation axis of the actuating lever, and regardless of a location that said cable end nipple interferes with said outer edge lines on the two opposed splitting walls of said strut, when said cable end nipple is pushed in a cable releasing direction, said cable end nipple is aligned so as to permit said cable end nipple to enter a space between said two opposed splitting walls of said strut while applying a rotational force around an operating cable axis against said oppositely inclined intercrossing outer edge lines of said two opposed splitting walls of said strut.

2. The operating cable apparatus according to claim 1, wherein
    an intercrossing section between said oppositely inclined intercrossing outer edge lines on said two opposed splitting walls of said strut viewed from said direction of said rotation axis of the actuating lever is aligned with a hooking section of said projections of the cable end nipple on said free end of the actuating lever along said cable operating direction.

3. A method of connecting an operating cable apparatus comprising;
    a strut, one end thereof engaging with one responsive member, an actuating lever pivotally mounted on an other end of said strut and engaging with an other responsive member in the vicinity of a pivot section between said actuating lever and the other end of said strut, in which a free end of said actuating lever, rotatably placed in a space between two opposed splitting walls at an intermediate portion between both ends of said strut, branches away two opposed splitting plates being separated in a direction of a rotation axis of said actuating lever,
    a cable end nipple, comprised of a flat portion and projections projecting from two flat side surfaces of said flat portion, said cable end nipple being securely fixed on one end of the operating cable, in which said flat portion is positioned between said two opposed splitting plates of said actuating lever, and
    said projections are hooked on said free end of the actuating lever in a cable operating direction,
    said method including connecting said cable end nipple to said free end of the actuating lever according to the following steps:
    rotating said cable end nipple around a cable axis so that said flat side surfaces become parallel to said two opposed splitting plates;
    inserting said cable end nipple into said two opposed splitting walls of the strut in a cable releasing direction;

passing said cable end nipple through a tip portion on said free end of the actuating lever;

aligning said cable end nipple with a position corresponding with a connecting portion of the cable end nipple and the free end of the actuating lever;

pulling said cable end nipple in the cable operating direction to make a connection between said cable end nipple and said free end of the actuating lever, and rotating said actuating lever and strut relative to each other at said pivot section thereby separating said both responsive members apart, wherein outer edge lines on said two opposed splitting walls of said strut at their cable operating direction side located around an intermediate portion between the two strut ends are oppositely inclined to intercross each other viewed from said direction of said rotation axis of the actuating lever, and regardless of the location that said cable end nipple interferes with said outer edge lines on the two opposed splitting walls of said strut, when said cable end nipple is pushed in the cable releasing direction, said cable end nipple is aligned so as to permit said cable end nipple entering a space between said two opposed splitting walls of said strut while applying a rotational force around an operating cable axis against said oppositely inclined intercrossing outer edge lines of said two opposed splitting walls of said strut.

4. An operating cable connecting apparatus connected according to the method of claim 3, wherein an intercrossing section between said oppositely inclined intercrossing outer edge lines on said two opposed splitting walls of said strut viewed from said direction of said rotation axis of the actuating lever is aligned with a hooking section of said projections of the cable end nipple on said free end of the actuating lever along said cable operating direction.

* * * * *